United States Patent [19]
Dodd et al.

[11] Patent Number: 6,148,380
[45] Date of Patent: *Nov. 14, 2000

[54] METHOD AND APPARATUS FOR CONTROLLING DATA TRANSFER BETWEEN A SYNCHRONOUS DRAM-TYPE MEMORY AND A SYSTEM BUS

[75] Inventors: James M. Dodd, Citrus Heights; Richard Malinowski, El Dorado Hills, both of Calif.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/735,433

[22] Filed: Jan. 2, 1997

[51] Int. Cl.$^7$ ...................................................... G06F 13/00
[52] U.S. Cl. ........................ 711/154; 711/105; 711/150; 711/151; 711/158; 711/167; 711/169
[58] Field of Search ................................ 365/189.05, 52, 365/233; 395/556, 555, 494, 558, 393, 481, 496; 711/167, 169, 154

[56] References Cited

U.S. PATENT DOCUMENTS

| | | | |
|---|---|---|---|
| 5,353,429 | 10/1994 | Fitch . | |
| 5,490,114 | 2/1996 | Butler et al. | 365/189.05 |
| 5,513,135 | 4/1996 | Dell et al. | 365/52 |
| 5,560,000 | 9/1996 | Vogley | 395/556 |
| 5,572,722 | 11/1996 | Vogley | 395/555 |
| 5,587,961 | 12/1996 | Wright et al. | 365/233 |
| 5,603,010 | 2/1997 | Dodd et al. . | |
| 5,608,896 | 3/1997 | Vogley | 395/558 |
| 5,615,358 | 3/1997 | Vogley | 395/494 |
| 5,627,985 | 5/1997 | Fetterman et al. | 395/393 |
| 5,630,096 | 5/1997 | Zuravleff et al. | 395/481 |
| 5,655,105 | 8/1997 | McLaury | 395/496 |
| 5,673,233 | 9/1997 | Wright et al. | 365/233 |
| 5,926,828 | 7/1999 | Khandekar . | |

*Primary Examiner*—John W. Cabeca
*Assistant Examiner*—Fred F. Tzeng
*Attorney, Agent, or Firm*—Blakeley, Sokoloff, Taylor & Zafman LLP

[57] ABSTRACT

An interface and method for a synchronous DRAM (syncDRAM) memory are provided that improve performance. The read operation in a syncDRAM is significantly sped up by eliminating the step of opening a new page of data in a SyncDRAM using a speculative read method. This provides the ability to open a page of information in the SyncDRAM with a command generator in response to a data request. Speculative read logic is also included to continue reading from the page with an invalid address until a second read request occurs. Thus, in the event that a subsequent read request occurs that requests data located on the same page as the prior request, the data can be indexed and read from a location on that page without having to first assert the SCS# and SCAS#. This frequently removes the step of opening a page from the read process and, over time, can significantly speed up the overall SyncDRAM reads in a computer system.

3 Claims, 5 Drawing Sheets

METHOD AND APPARATUS FOR CONTROLLING DATA TRANSFER BETWEEN A SYNCHRONOUS DRAM-TYPE MEMORY AND A SYSTEM BUS

BACKGROUND OF THE INVENTION

1. Field of the Invention

The present invention generally relates to data communications in a computer system and, more particularly, to memory control design to support synchronous Dynamic Random Access Memory (SyncDRAM) type memory.

2. Description of Related Art

In conventional central processing unit (CPU) designs, speed in which data is transferred within the CPU has been increasing rapidly with the advent Reduced Instruction Set Computers (RISC) architectures and even more so due to extensive use of pipelining. However, unlike the CPU development, development of different types of memory has concentrated on increasing media density in order to reduce the cost per bit of memory and not speed. This disparity has created an imbalance in memory bandwidth required for small low-cost systems. External interleaving to improve memory bandwidth has been employed to overcome this problem, but has failed. External interleaving has become a less favorable option due to use of asynchronous interfaces, high timing margins, high data rate, and a lack of registers for control signals, addresses and input/outputs. The cost of external interleaving is also high due to additional glue logic and total memory density required for a given bandwidth. This imbalance created the need for syncDRAM type memory units.

SyncDRAMs offer extensive memory density with low cost and high bandwidth memory architecture. Furthermore, syncDRAMs are able to support various applications like mainstore, peripherals, graphics and video. SyncDRAMs are designed for a wide range of applications with programmable features such as latency, burst length and burst-type. They can support single or dual bank high frequency and low power operations.

A key feature provided by syncDRAMs is immediate access to multiple blocks of data called "bursts." Burst length refers to the number of words that will be output or input in a read or write cycle respectively. After a read burst has completed, the output bus will become high impedance. The burst length is programmable as 1, 2, 4 or 8 words, or full page. The ability of the CPU to access these bursts of information gives the CPU access to wider bandwidth of memory.

The syncDRAM operates similar to its predecessor DRAM with further advanced features. Unlike conventional DRAMs, the syncDRAM is able to provide bursts of data in a series of 0 to 8 words in a single cycle or, when in page mode, can transfer a burst of an entire page to a destination unit. In a typical sequence, a microprocessor in the computer system will send a read or write request through the system bus to the memory control. The memory control will generate a signal which is sent through the DRAM bus to the syncDRAM for execution. Once the command is received by the syncDRAM, the syncDRAM proceeds with a pre-programmed sequence for transferring the data.

The syncDRAM must be initialized in the power-on sequence, much like conventional DRAMs, before data can be transferred. During initialization, the syncDRAM internal clock and data mask must be activated to avoid having data written into the syncDRAM during the sequence. There is typically a 100 ms delay that proceeds any commands being handled by the syncDRAM after the initiation sequence has begun. When asserting a command, a chip enable must be asserted so that commands are recognized by the syncDRAM for execution. Within the syncDRAM, commands executed correspond to the rising edge of the internal clock. When a command is sent to the syncDRAM, a clock enable signal (CE) allows the syncDRAM to receive the command and determine the validity of the next clock cycle. If the clock enable is high, the next clock rising edge is valid, otherwise it is invalid. If the clock rising edge is invalid, the internal clock is not asserted and operations in the syncDRAM are suspended. In conventional use, each time a command is asserted to the syncDRAM to transfer data, the chip must be initiated using the chip select and the clock enable in the same clock in order for the command to be recognized by the syncDRAM.

Once the chip is initialized with concurrent assertion of the chip enable and clock enable commands, data transfer can begin. When the address is valid, a page hit occurs and the syncDRAM is then ready to transfer data. The page is then indexed for specific data to be transferred. If an address request is invalid, however, a page miss occurs and a new page must then be opened to properly locate the requested data.

According to the preset burst rate, a series of words are then transferred to the syncDRAM unit in response to a write request or from the syncDRAM unit in response to a read request. In the case where data is not ready to be transferred, either in a read or write request, the syncDRAM continues to transfer the burst of data regardless of the data's readiness. In the case of a read request, data is continually read from an initial burst start address once initiated. Following the initial transfer of the word from the burst start address, an internal address incrementer in the syncDRAM increments the reading pointer to transfer consecutive words following the burst start address up to the end of the burst length preset by the DRAM whether the data path controller is ready to accept data or not.

Similarly, during a write sequence, after an initial word is transferred to the burst start address, the internal incrementer then increments the internal address to receive consecutive words following the burst start address in subsequent addresses regardless of whether or not data is ready at the sending device. The data path controller 18 determines whether data will be transferred.

In operation, the syncDRAM can be enabled by a command from a memory control unit responding to a data transfer request from the CPU. The syncDRAM responds with an initiation process that includes internally latching an address from which data will be read or written to. Each time a burst of data is requested, the syncDRAM must go through the initiation sequence in order to access the address from which data will be read or written. The time it takes to complete the initiation process will deficit the overall memory retrieval time needed to access the data.

Accordingly, it would be of great use to a computer industry to further speed up the already efficient syncDRAM memories by reducing the time it takes to access the syncDRAMs by reducing the time it takes to initiate the data retrieving cycle. In the event data is not ready to be transferred, conventional implementations require a second request to send data to or read data from the syncDRAM when the data is ready. This requires a subsequent read or write request which requires initializing the syncDRAM and opening a page again.

The operation of reading from the syncDRAM, in particular, requires not only initiating the syncDram, but also opening a particular page as well as the location on a page where specific data is located. To eliminate one or more of these steps in the reading operation would significantly speed up the reading operation, thus, making data available to the computer system much faster. As will be seen, the present invention in one embodiment, accomplishes this in a simple and elegant matter.

SUMMARY OF THE INVENTION

The present invention, in one embodiment, provides an interface and method for a synchronous DRAM (syncDRAM) memory that improve performance. In one embodiment, the read operation in a syncDRAM is significantly sped up by eliminating the step of opening a new page of data in a syncDRAM using a speculative read method. The embodiment provides the ability to open a page of information in the syncDRAM with a command generator in response to a data request. Speculative read logic is also included in the apparatus to continue reading from the page with an invalid address until a second read request occurs. Thus, in the event that a subsequent read request occurs that requests data located on the same page as the prior request, the data can be indexed and read from a location on that page without having to first assert the SCS# and SCAS#. This frequently removes the step of opening a page from the read process and, over time, can significantly speed up the overall syncDRAM reads in a computer system.

DETAILED DESCRIPTION OF THE PREFERRED EMBODIMENT

FIGS. 2–5 of the drawings disclose various embodiments of the present invention for purposes of illustration. One skilled in the art will recognize alternative embodiments that may be employed without departing from the principles of the invention that are illustrated by the structures and methods described and claimed herein.

Figure 1:
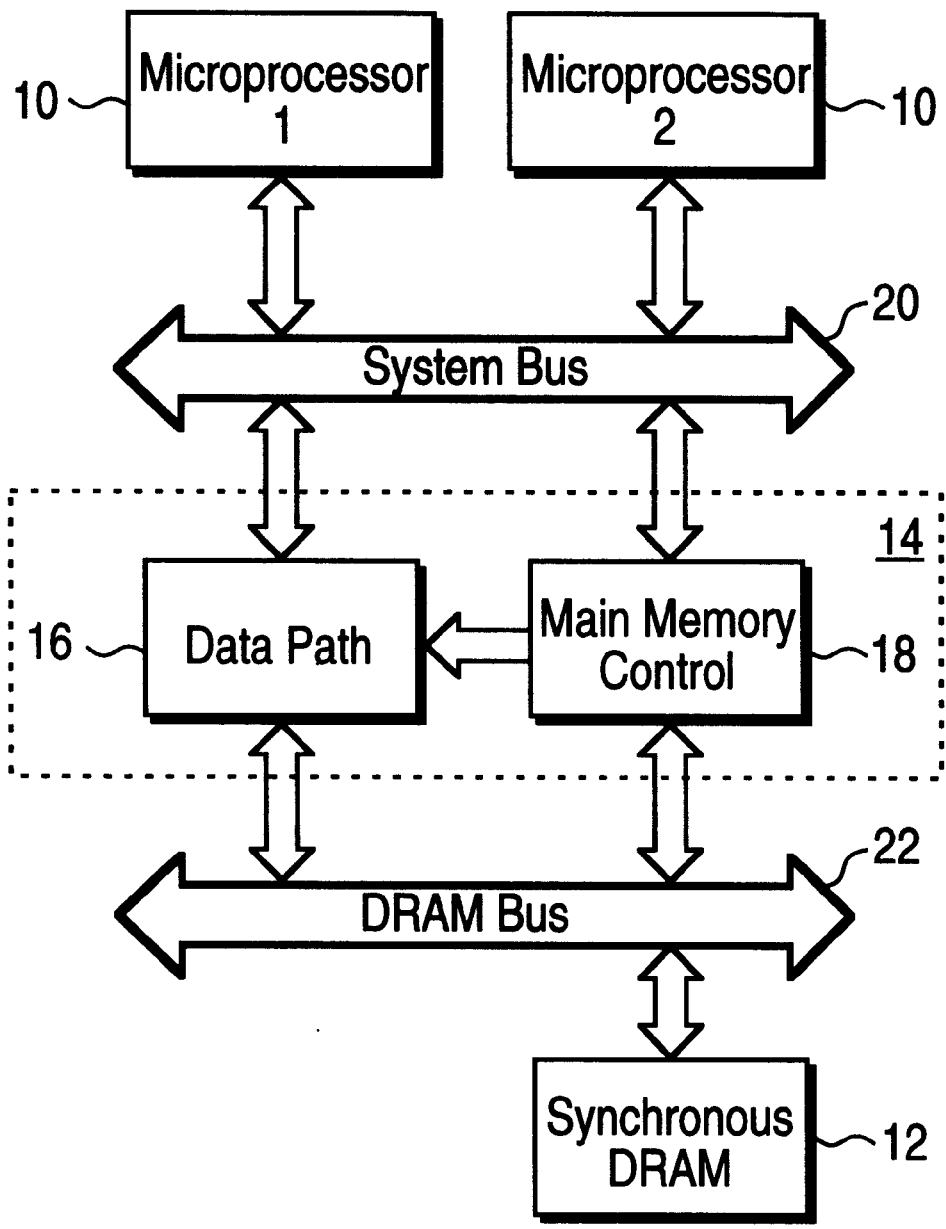
FIG. 1 is a general block diagram of a computer system employing a memory control of the prior art.

The present invention provides a method and apparatus for controlling data transfer between a synchronous DRAM-type memory (syncDRAM) and a system bus. As can be seen in FIG. 1, a conventional computer system can have one or more nicroprocessors 10 communicating with the system bus 20. A conventional computer system further comprises various memory banks that can include syncDRAM memory. The microprocessors communicate with the syncDRAM memory 12 through memory control 14. Included in the memory control is a datapath 16 through which data is transferred from any one of the microprocessors to the syncDRAM 12 and a data path controller 18 that provides an interface among the datapath 16, the system bus 20 and a DRAM bus 22 that ultimately communicates with the syncDRAM memory 12.

Figure 2:
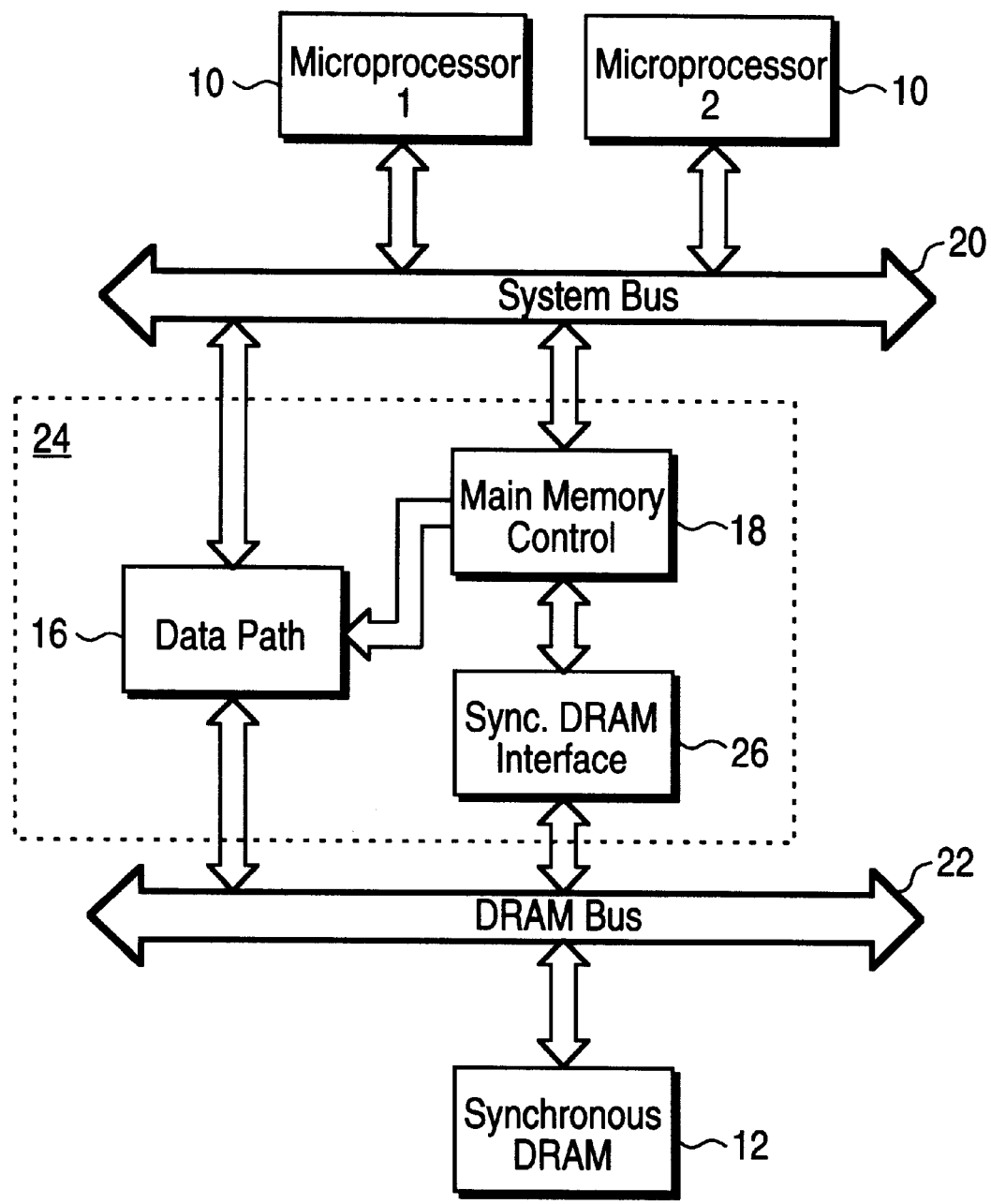
FIG. 2 is a general block diagram of a computer system in employing a memory control and a syncDRAM interface in accordance with one embodiment of the present invention.

In one embodiment of the present invention illustrated in FIG. 2, the advance memory control 24 operates similar to conventional memory controls with an included syncDRAM interface 26 for providing special controls during read cycles between the system bus 20 and the syncDRAM 12. The syncDRAM interface 26 is shown communicating with the data path controller 18 and the DRAM bus 22, with the DRAM bus 22 communicating with the syncDRAM 12.

Figure 3:
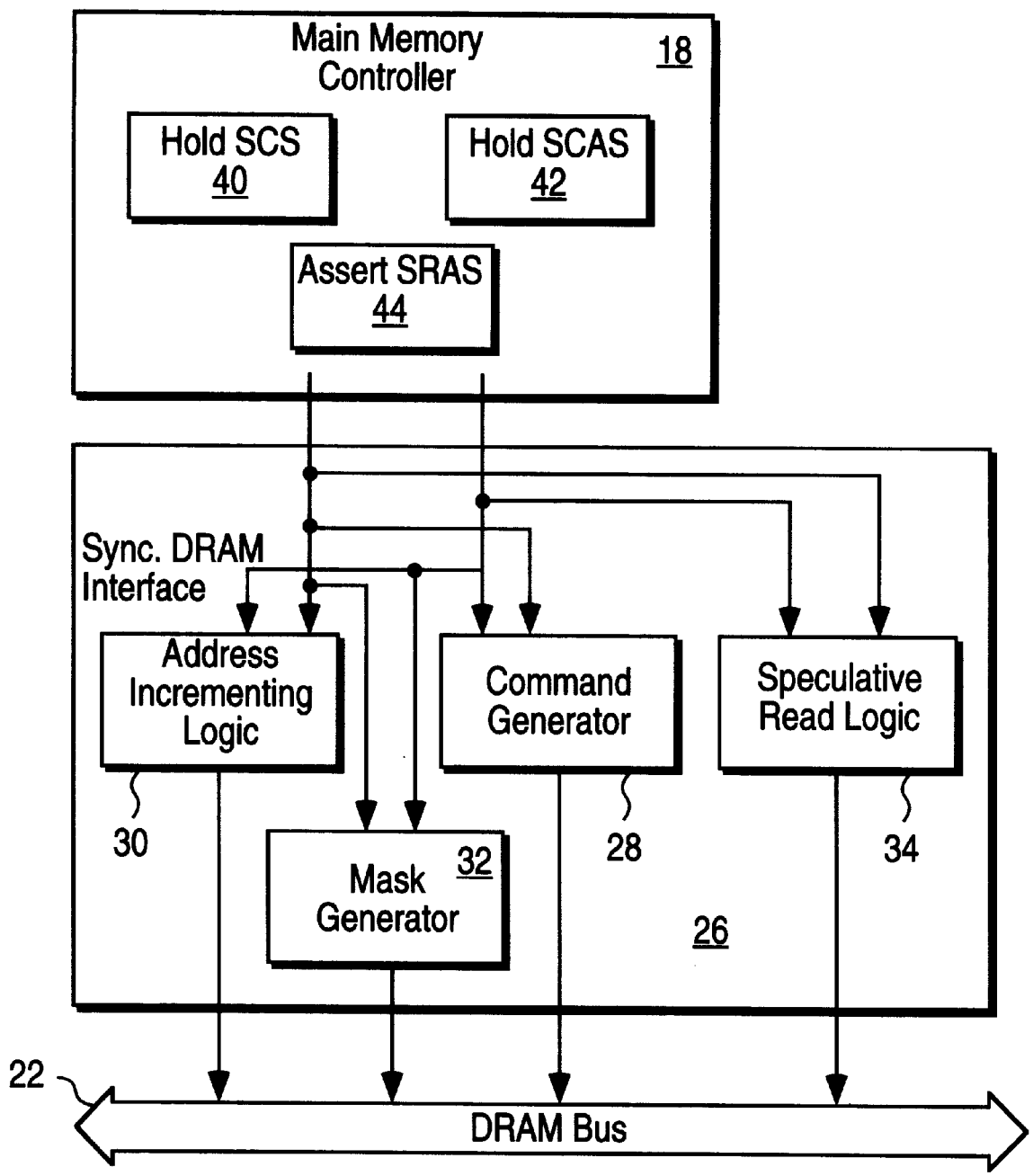
FIG. 3 is a general block diagram of a main memory controller and a syncDRAM interface in accordance with one embodiment of the present invention.

Further details of the syncDRAM interface 26 are shown in FIG. 3. The interface 26 includes a command generator 28 communicating with the memory controller 18 and the DRAM bus 22, address incrementing logic 30 communicating with the memory controller 18, the command generator 28, the DRAM bus 22 and a mask generator 32 communicating with the data path controller 18, the address incrementing logic 30, the command generator 28 and the DRAM bus 22.

The command generator 28 is configured to produce commands to control the syncDRAM 12 of FIG. 2 including row address strobe (RAS#), column address strobe (CAS#) and write enable (WE#). A chip select (CS#) in the syncDRAM is controlled in conventional syncDRAM configurations internally and activated upon each data access to the syncDRAM. In one embodiment of the present invention however, CS# is held active low externally during read sequences. This allows for speculative reading of data as will be described in more detail below. These are standard commands that are recognized by syncDRAMs in their conventional implementation. These commands are similar to conventional DRAMs, but have additional functions. In a system where DRAMs and syncDRAMs are implemented among other types of memory in a single computer system, these commands may be distinguished by SRAS#, SCAS#, SWE# and SCS# respectively to associate the commands specifically with a syncDRAM in the system.

The syncDRAM interface 26 further includes address incrementing logic 30 that keeps account of the internal address incremented in the syncDRAM during a burst by holding the address received from the main memory control. This function will be described in further detail below.

Although the separate mechanisms of the SyncDRAM interface are illustrated in the abstract in FIG. 3 by block diagram, these separate mechanisms can be implemented using logic circuitry in the form of hardware as well as software used in conjunction with a microprocessor or controller. Many skilled in the art of computer design have available many methods to implement logic circuits to interface with a syncDRAM. The present invention, however, is not limited to any one particular configuration that falls within the scope of the claims below.

Figure 4:
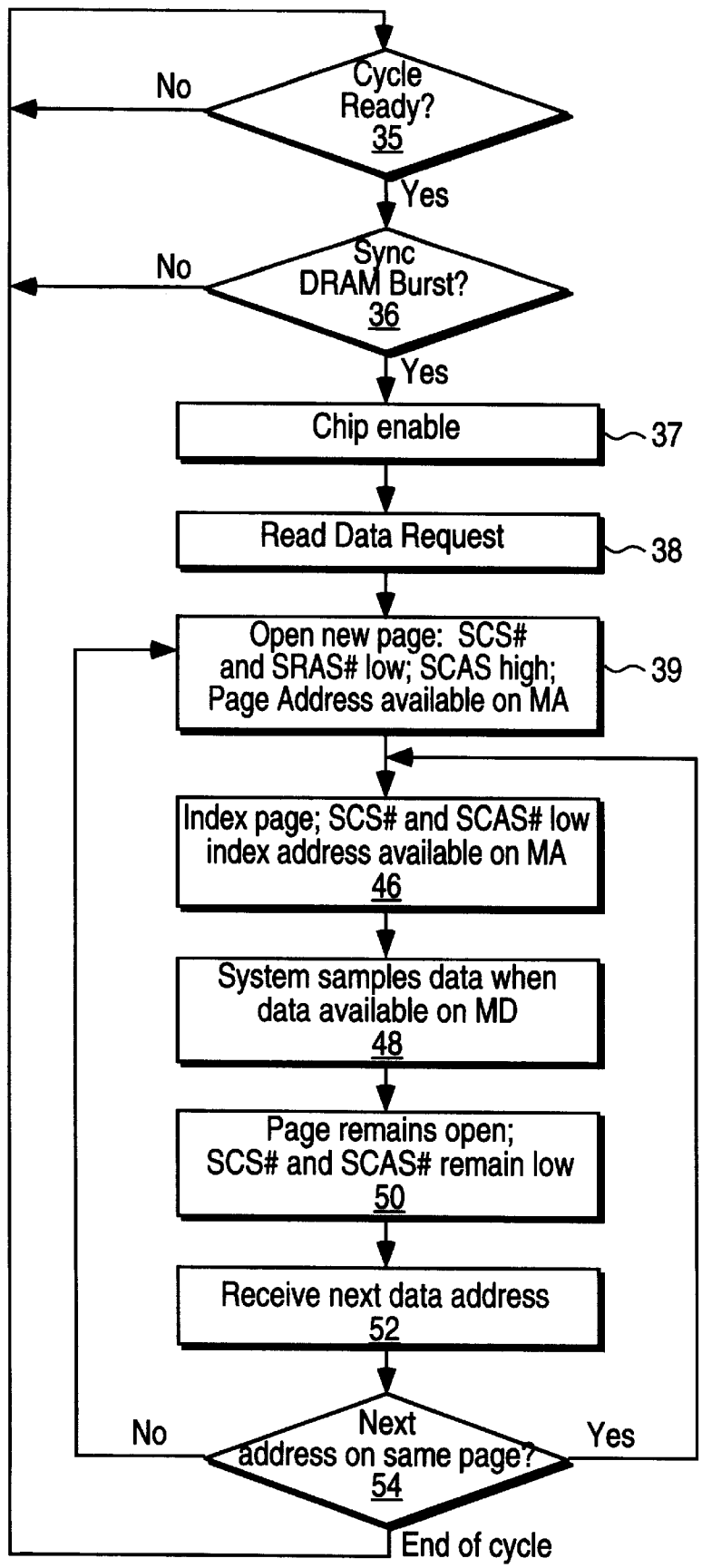
FIG. 4 is a flow chart for describing functional aspects of one embodiment of the present invention.

Details of the above described embodiment of the present invention is best described by its function as illustrated in the flow diagram of FIG. 4. This diagram will be discussed in conjunction with the two timing diagrams of FIG. 5 which show the sequence of commands executed in a syncDRAM with respect to time in the case of a read request.

Referring first to FIG. 4, in the first stage 35, the memory control determines whether the cycle is ready. The second stage 36 determines whether a syncDRAM burst is requested. In order for the interface to respond, a primary request must first be sent through the system to begin data transfer from the syncDRAM memory, a primary request being a read or write request originating from a microprocessor in the system and being sent through the system bus and the main memory controller to initiate the syncDRAM. It is important to note that a burst could be as few as one word of data. Once ready, the data retrieval process begins with a chip enable 37, then continues with an initial read data request 38 from the computer system into the syncDRAM interface. The next step 39 is to open a new page. In this step, the chip select (SCS#) and the row address strobe (SRAS#) are asserted and held low, and the column address strobe (SCAS#) is deasserted and held high. This step assumes that the page address is available and valid in the syncDRAM. The next step 46 is to index the open page where data is located. In this step, the bus SCS# and SCAS# are asserted and held low while the index address is available on address MA.

The next step 48 allows the system to sample the available data when available on the data bus MD. Once the data is sampled by the system, the next step 50 holds the page open while waiting for the next address by holding SCS# and SCAS# asserted low. This is distinguishable from conventional applications of syncDRAMs which typically pulse SCS# and SCAS# when opening a page. The conventional method requires that SCS# and SCAS# are asserted only when a new read is being initiated to the open page. The next data address is received in step 52.

Next is query 54 for determining whether the new address for the new data request is on the same page as the prior request. In accordance with the present invention, if the next address occurs on the same open page as the prior request, the syncDRAM interface simply indexes the same page by holding SCS# and SCAS# low when the next address is available on the address bus MA by returning to step 46. On the other hand, if the next address is not located on the same page as the prior request, the system returns to step 39 to open a new page by deasserting SCAS# and asserting SCS# and SRAS# low. The new page opens when the page address is available on the address bus MA. Once the cycle ends, the sequence returns to step 35 for a new cycle.

Figure 5:
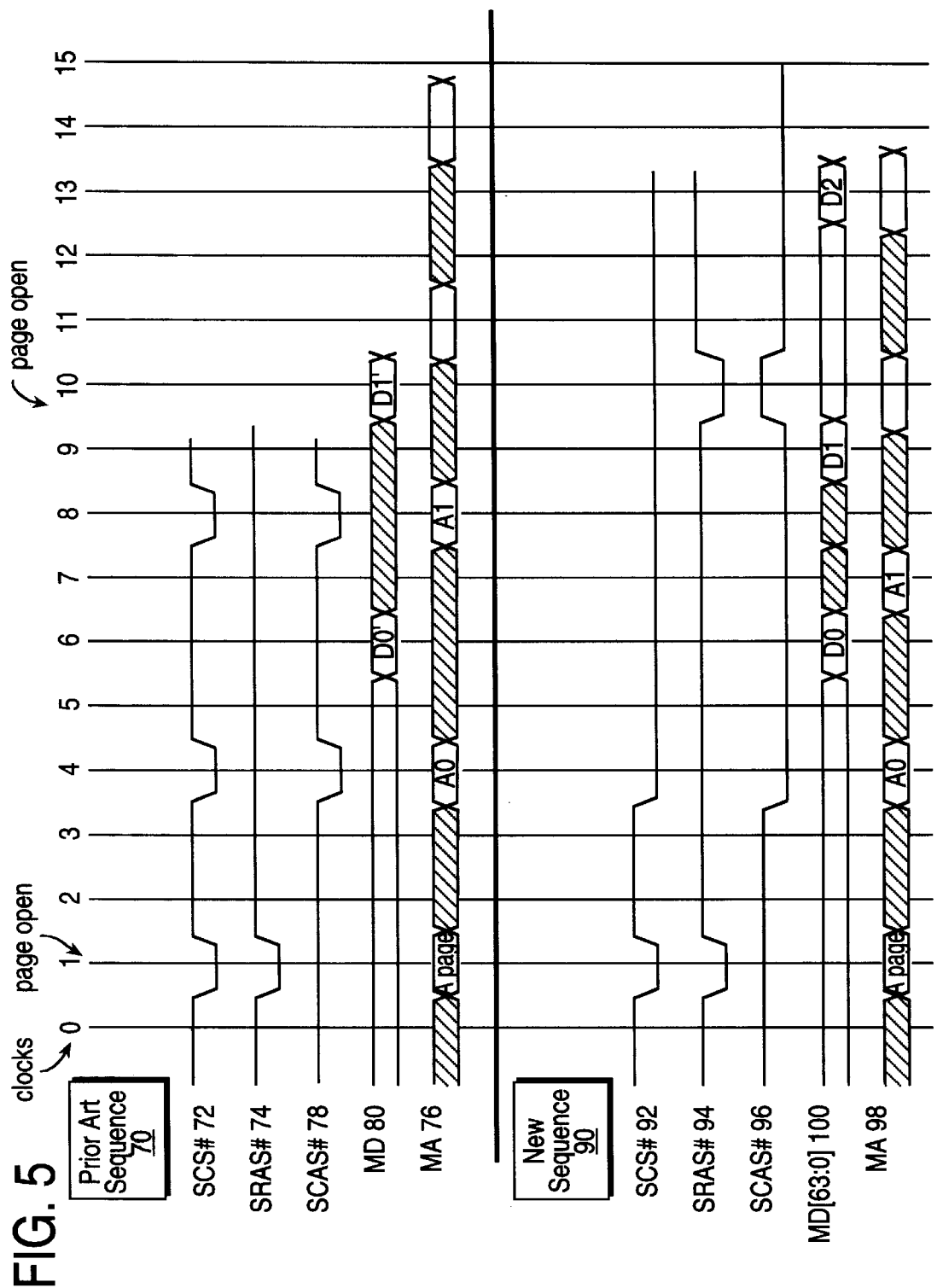
FIG. 5 is a time diagram illustrating commands utilized in read requests in accordance with one embodiment of the present invention.

Now referring to FIG. 5, a contrast can be seen between the routing command sequence of the prior art with the new sequence according to one embodiment of the present invention. For purposes of clear illustration, it will be assumed for this discussion that the commands are asserted active low which is indicated on the timing diagram graphically where the active low step on a command line, is below the inactive step along the same time line. Also, the clocks indicate the rising edge of each signal that is synchronicity with a memory clock. Finally, the timing diagrams of FIG. 5 presume that the clock enable (CKE) signal is constantly asserted during the reading sequence.

Referring first to the prior art sequence 70, it can be seen that the initial step occurring on clock number 1 is a page open step where the SCS# signal 72 and the SRAS# signal 74 are asserted together active when an address is available on the address bus MA 76. Data is indexed on the open page of the syncDRAM by then asserting the SCS# signal 72 along with the SCAS# signal 78 in clock cycle 4. With the column address strobe now pointed to the data, data is then available on clock 6 for the system to sample and read the data D0'.

If a second request occurs and the data is located on the same page, the SCS# signal 72 and the SCAS# signal 78 are again pulsed active on clock number 8 giving the second block of data D1' on clock number 10. As with both data requests, the data is available for sampling by the system two clock cycles after the SCS# 72 and SCAS# signal 78 are asserted. Again, for the second request, the address for the data must be available on the address bus MA 76 in clock 8 in order for a page to be indexed on clock 8 and for data to be available on the data bus MD 80 two clocks later.

Referring now to the new sequence 90, it can be seen that the first page is open in the same matter as the prior art. As in the prior art, the new information, in accordance with the present invention, asserts the SCS# 92 along with the SRAS# 94 while the page address is available on address bus MA 96. The page is then indexed by asserting the SCS# signal 92 along with the SCAS# signal 96 when the index address A0 is available on the address bus MA 98 in clock cycle 4. The data D0 is then available two clocks later on the data bus 100 for the system to sample.

In this new sequence, in accordance with the present invention, the SCS# 92 and the SCAS# 96 are held active by asserting them low until a new address is available on the address bus MA 98. The next address A1 being available on the address bus MA 98 in clock 7 then gives data two clocks later on the data bus MD 100 on clock number 9. As can be seen in comparison with the prior art sequence, D1 is now available one clock earlier than D1' in the prior art sequence 70. This is where the savings is recognized in the event that the index address is on the same page as the prior indexed address. Statistically, this can occur in as much as 50% of the read sequences in a typical system, giving a great deal of savings in time for memory reads.

In the event that the speculative read is attempted and the next address request is for data located on a different page, a page miss must occur and a new page must be opened. In this event, the SCS# signal 92 is maintained active and the SRAS# signal 94 is pulsed active to access a new page. The next address can then be indexed on a subsequent clock giving data that occurs three clocks from the previous data read. This is exactly what would occur in the prior art sequence 70 in the event of a page miss.

Thus, in the event that a page hit occurs where two consecutive addresses occur on the same page, one clock is saved. Whereas, in the event that a page miss occurs where two consecutive address are located on different pages, no time loss occurs in retrieving data in comparison to the prior art sequence 70. In other words, if consecutive data requests occur for data located on a common page in the syncDRAM, one clock is saved. Conversely, if consecutive data requests occur for data located on different pages, only a single clock cycle is required to retrieve the data, giving accessibility to the data in the same amount of time as the prior art sequence 70.

From the above description, it will be apparent that the invention disclosed herein provides a novel and advantageous method and apparatus for controlling data transfer between a synchronous DRAM-type memory and a system bus. As will be understood by those familiar with the art, the invention may be embodied in other specific forms without departing from its spirit or essential characteristics, and thus, the described embodiment is not restrictive of the scope of the invention. The following claims are indicative of the scope of the invention, and all variations which come within the meaning and range of equivalency of the claims are to be embraced within their scope.

What is claimed is:

1. A method of reading from a synchronous dynamic random access memory (SDRAM), comprising:

opening a page of data of the SDRAM in response to a first read request;

reading data from the opened page in response to the first read request;

keeping the page of data open prior to deciding whether a second read request is for data on the page opened or on a different page;

deciding whether the second read request is for data on the page opened or on the different page;

if the second read request is for data on the different page, then opening the different page and reading data from the different page in response to the second read request;

if the second read request is for data on the page opened, then in response to the second read request reading data from the page opened;

wherein keeping the page of data open further comprises having an SDRAM controller assert chip select and column address strobe signals and send those signals to the SDRAM.

2. A controller for a synchronous dynamic random access memory (SDRAM), comprising:

circuitry configured to open a page of the SDRAM in response to a first read request;

circuitry configured to keep the page of data open prior to deciding whether a second read request is for data on the page opened or on a different page;

circuitry for deciding whether the second read request is for data on the page opened or on the different page;

wherein chip select and column address strobe signals are used by the SDRAM controller to keep the page of data open.

3. A system comprising:

a data processor;

a synchronous dynamic random access memory (SDRAM);

an SDRAM controller comprising:

circuitry configured to open a page of data of the SDRAM in response to a first read request from the data processor;

circuitry configured to keep the page of data open prior to deciding whether a second read request from the data processor is for data on the page opened or on a different page;

wherein the SDRAM controller further comprises circuitry configured to decide whether the second read request is for data on the page opened or on the different page;

wherein the SDRAM controller uses chip select and row address strobe signals to open a page on the SRAM, and wherein the SDRAM controller uses chip select and column address strobe signals to keep the page open.

* * * * *